United States Patent
Bonar et al.

(10) Patent No.: US 10,739,595 B2
(45) Date of Patent: Aug. 11, 2020

(54) APPLICATION SPECIFIC INTEGRATED CIRCUIT FOR WAVEGUIDE DISPLAY

(71) Applicant: Facebook Technologies, LLC, Menlo Park, CA (US)

(72) Inventors: James Ronald Bonar, Redmond, WA (US); Gareth Valentine, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/171,822

(22) Filed: Oct. 26, 2018

(65) Prior Publication Data

US 2019/0227320 A1 Jul. 25, 2019

Related U.S. Application Data

(60) Provisional application No. 62/620,438, filed on Jan. 22, 2018.

(51) Int. Cl.
*G02B 27/01* (2006.01)
*F21V 8/00* (2006.01)

(52) U.S. Cl.
CPC ....... *G02B 27/0172* (2013.01); *G02B 6/0026* (2013.01); *G02B 6/0068* (2013.01); *G02B 2027/0125* (2013.01); *G02B 2027/0178* (2013.01)

(58) Field of Classification Search
CPC .............. G02B 27/017; G02B 27/0172; G02B 27/0176; G02B 2027/0174; G02B 2027/0178; H04N 13/332–344
See application file for complete search history.

(56) References Cited

U.S. PATENT DOCUMENTS

| | | | |
|---|---|---|---|
| 6,185,016 B1 * | 2/2001 | Popovich | G02B 27/017 348/40 |
| 6,271,808 B1 * | 8/2001 | Corbin | G02B 27/0172 345/7 |
| 9,632,312 B1 * | 4/2017 | Cakmakci | G02B 5/1852 |
| 9,806,522 B2 | 10/2017 | Reichow et al. | |
| 10,215,983 B2 * | 2/2019 | Gao | G02B 6/00 |
| 10,247,870 B2 * | 4/2019 | Chen | G02B 6/0028 |
| 2005/0167823 A1 | 8/2005 | Morris | |

(Continued)

FOREIGN PATENT DOCUMENTS

WO 2015/081313 A2 6/2015

*Primary Examiner* — Gene W Lee
(74) *Attorney, Agent, or Firm* — FisherBroyles, LLP (57) ABSTRACT

The disclosed waveguide display device may include a waveguide and one or more projector assemblies configured to project image light into the waveguide, where each of the one or more projector assemblies includes a first monochromatic emitter array having a plurality of emitters of a first color disposed in a two-dimensional configuration and a second monochromatic emitter array having a plurality of emitters of a second color disposed in a two-dimensional configuration. The display device may also include at least one application specific integrated circuit (ASIC) configured to drive the first and second monochromatic emitter arrays to emit images of the first and second color along a common axis, with the first color being different from the second color. Various other devices, systems, and methods are also disclosed.

19 Claims, 5 Drawing Sheets

(56) References Cited

U.S. PATENT DOCUMENTS

| | | |
|---|---|---|
| 2011/0037082 A1 | 2/2011 | Doan et al. |
| 2013/0208482 A1* | 8/2013 | Fleck .................. G02B 27/017 362/293 |
| 2013/0250207 A1* | 9/2013 | Bohn ..................... G02B 6/00 349/61 |
| 2015/0146301 A1* | 5/2015 | Wong ................. G02B 27/0101 359/633 |
| 2016/0097931 A1* | 4/2016 | Takahota ............... G02B 27/01 345/690 |
| 2016/0327722 A1* | 11/2016 | Chen ................... G02B 6/0028 |
| 2016/0342206 A1 | 11/2016 | Shazly et al. |

* cited by examiner

APPLICATION SPECIFIC INTEGRATED CIRCUIT FOR WAVEGUIDE DISPLAY

CROSS-REFERENCE TO RELATED APPLICATION

This application claims priority to and the benefit of U.S. Provisional Application No. 62/620,438, which is entitled "APPLICATION SPECIFIC INTEGRATED CIRCUIT FOR WAVEGUIDE DISPLAY" and was filed on Jan. 22, 2018, the entire contents of which are incorporated herein by reference.

BACKGROUND

This disclosure relates generally to near-eye display (NED) systems with waveguide displays. In conventional NED systems, a single polychromatic light source is typically driven by a single application specific integrated circuit (ASIC) assembly. However, such a configuration may not be suitable for an NED system that uses multiple light sources (for example, multiple monochromatic light sources).

SUMMARY

As will be described in greater detail below, the instant disclosure describes ASIC configurations for NED systems wherein images from multiple monochromatic light sources are projected into a waveguide. A waveguide may represent an optical component that permits lateral propagation of a received image and, in some embodiments, replication of the image.

One aspect includes a waveguide display system with a projector assembly that projects image light into the waveguide. The projector assembly may have multiple monochromatic two-dimensional emitter arrays, each with emitters of a single color and projecting a monochromatic two-dimensional image. An ASIC assembly having one or more ASICs may be configured to drive each of the monochromatic emitter arrays to emit separate single-color images along a common axis for projection into the waveguide assembly.

In some embodiments, a separate ASIC may drive each monochromatic emitter array so that if three arrays are used (for example, one red, one green, and one blue), three ASICs are used. One ASIC may be bonded to and drive the first monochromatic emitter array, another ASIC is bonded to and drives the second monochromatic emitter array, etc.

In some embodiments, a single ASIC may drive each monochromatic emitter array so that if three arrays are used (for example, one red, one green, and one blue), only one ASIC is used. The same ASIC may be bonded to and drive the first monochromatic emitter array, may be bonded to and drive the second monochromatic emitter array, etc.

In some embodiments, a single ASIC may drive each monochromatic emitter array but not be directly bonded to the arrays. A silicon interposer may be bonded (on one side) to the ASIC, and the interposer may be bonded (on the other side) to each of the monochromatic emitter arrays. The ASIC may drive the arrays via the interposer.

In some embodiments, a single ASIC may drive each monochromatic emitter array via an interposer. However, the ASIC may be configured to drive the monochromatic emitter arrays in sequence by, for example, sequentially addressing common cathodes and anodes.

In some embodiments, monochromatic images may be combined within the waveguide to produce polychromatic images, and polychromatic images may be displayed to a user wearing a near eye display including the waveguide.

Some embodiments may include the steps of bonding a first monochromatic emitter array and a second monochromatic emitter array to one or more ASICs configured to drive the first and second monochromatic emitter arrays to project image light into a waveguide. The image light may include at least (a) a two-dimensional monochromatic image in a first color emitted by the first monochromatic emitter array and (b) a two-dimensional monochromatic image in a second color emitted by the second monochromatic emitter array. The first and second colors may be different from each other, and the two-dimensional monochromatic images may be projected along a common axis.

In some embodiments, a near-eye display system may include a frame configured to be secured to a user's head (using, for example, eyeglass temples, goggle straps, etc.), a waveguide coupled to the frame, and one or more projector assemblies configured to project image light into the waveguide. Each of the one or more projector assemblies may include a first monochromatic emitter array having a plurality of emitters of a first color disposed in a two-dimensional configuration and a second monochromatic emitter array having a plurality of emitters of a second, different color disposed in a two-dimensional configuration. At least one application specific integrated circuit (ASIC) may be configured to drive the first and second monochromatic emitter arrays to emit images of the first and second colors along a common axis.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate several exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to a waveguide display system that has a waveguide and a projector assembly that projects image light into the waveguide. The projector assembly may include multiple monochromatic two-dimensional emitter arrays, each with emitters of a single color.

As will be explained in greater detail below, embodiments of the instant disclosure include various ASIC configurations for such waveguide display systems. An ASIC assembly having one or more ASICs may be configured to drive each of the monochromatic two-dimensional emitter arrays to emit separate single-color two-dimensional images along a common axis for projection into a waveguide assembly. In an embodiment, the ASIC is specifically designed and fabricated to drive monochromatic emitter arrays.

In some embodiments, a separate ASIC may drive each monochromatic emitter array, so that if three arrays are used (for example, one red, one green, and one blue), three ASICs are used. One ASIC may be bonded to and drive the first monochromatic emitter array, and another ASIC may be bonded to and drives the second monochromatic emitter array, etc.

In some embodiments, a single ASIC drives each monochromatic emitter array, so that if three arrays are used, only one ASIC is used. The same ASIC may be bonded to and drive the first monochromatic emitter array, may be bonded to and drive the second monochromatic emitter array, etc.

In some embodiments, a single ASIC drives each monochromatic emitter array, but is not directly bonded to the arrays. A silicon interposer may be bonded (on one side) to the ASIC, and the interposer may be bonded (on the other side) to each of the monochromatic emitter arrays. The ASIC may drive the arrays via the interposer.

In some embodiments, a single ASIC may drive each monochromatic emitter array via an interposer. However, the ASIC may be configured to drive each of the monochromatic emitter arrays in sequence by, for example, sequentially addressing common cathodes and anodes.

The following will provide, with reference to FIGS. 1-8, detailed descriptions of select embodiments.

Figure 1:
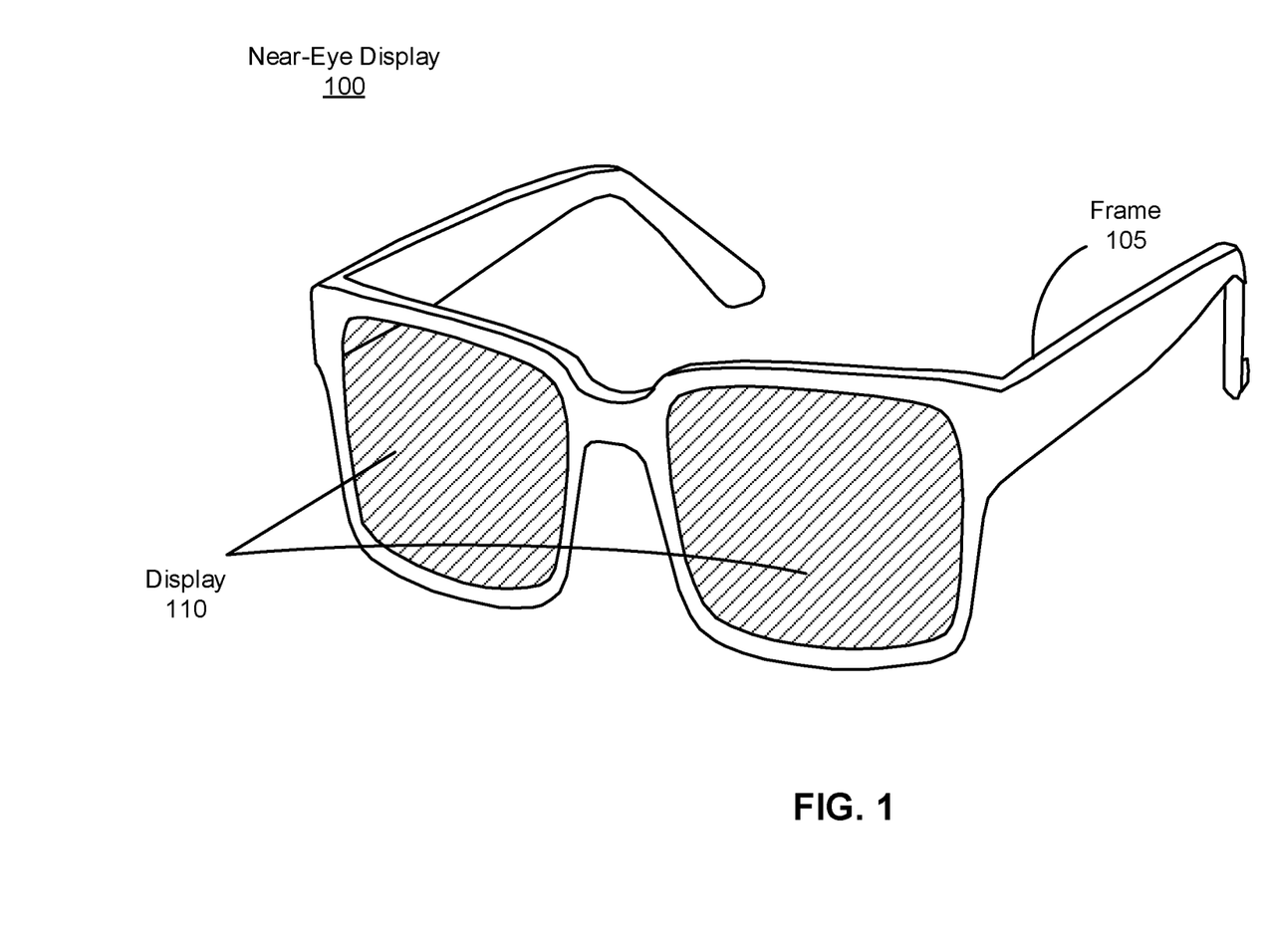
FIG. 1 is a diagram of an NED, in accordance with an embodiment.

FIG. 1 is a diagram of a near-eye-display (NED) 100, in accordance with an embodiment. In some embodiments, the NED 100 may be a head-mounted display (HMD) and may present media to a user. Examples of media presented by the NED 100 may include one or more images, video, audio, or some combination thereof. As used with respect to this embodiment, the term "near-eye display" refers to a device that includes wearable projected displays, often stereoscopic in the sense that each eye is presented with a slightly different field of view. A near-eye display may in some embodiments be a head-mounted display (HMD), a helmet-mounted display, an optical head-mounted display (OHMD), etc., and while typically stereoscopic, may also be monocular.

The NED 100 shown in FIG. 1 may include a frame 105 and a display 110. The frame 105 may be coupled to one or more optical elements that together display media to users. In some embodiments, the frame 105 may represent a frame of eye-wear glasses. The display 110 may be configured for a user to see the content presented by the NED 100. As discussed below in conjunction with FIG. 2, the display 110 may include at least one waveguide display assembly (not shown in FIG. 1) for directing image light to an eye of the user. The waveguide display may be a polychromatic display created by stacking waveguide displays whose respective monochromatic sources are of different colors.

Figure 2:
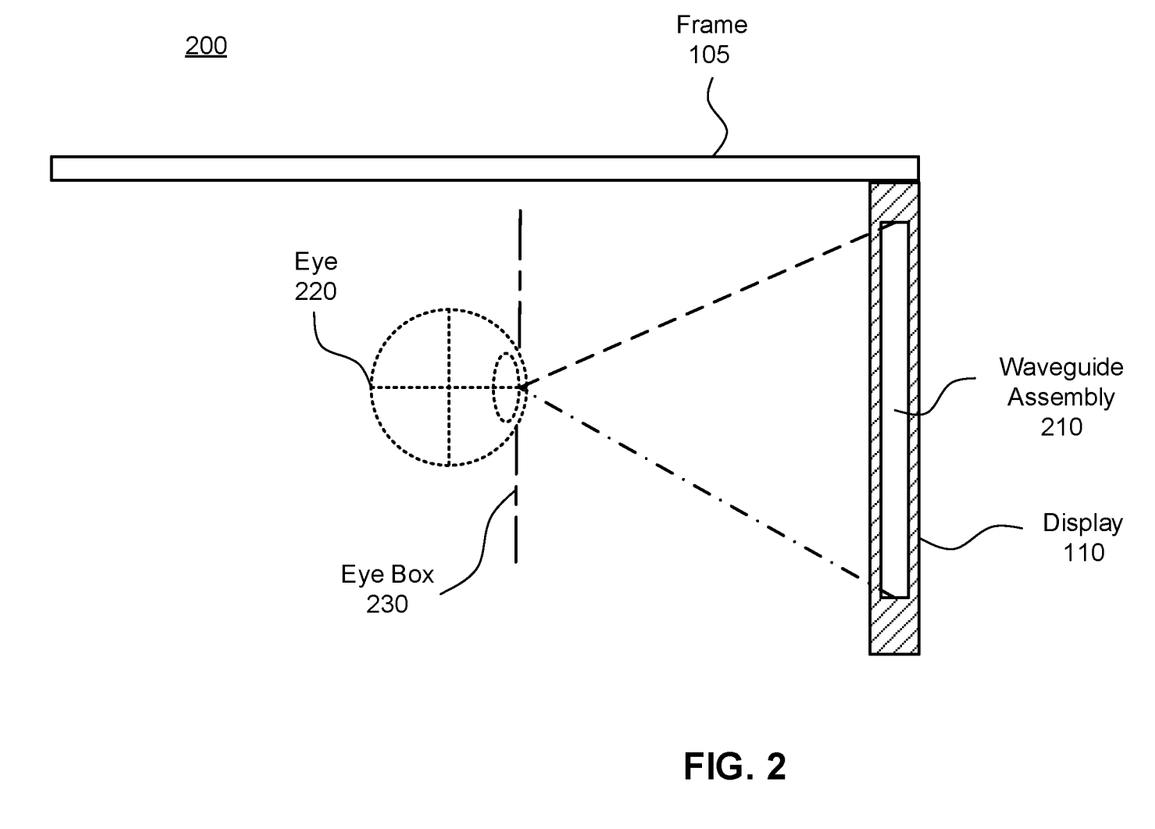
FIG. 2 is a cross-section of the NED illustrated in FIG. 1, in accordance with an embodiment.

FIG. 2 is a cross-section 200 of the NED 100 illustrated in FIG. 1, in accordance with an embodiment. As shown, the display 110 of the NED 100 may include at least one waveguide display assembly 210. The waveguide display assembly 210 may be composed of one or more materials (e.g., plastic, glass, etc.) with one or more refractive indices that effectively minimize the weight and widen a field of view of the NED 100. For purposes of illustration, FIG. 2 shows the cross section 200 associated with a single eye 220 and a single waveguide display assembly 210, but in alternative embodiments not shown, another waveguide display assembly (separate from the waveguide display assembly 210 shown in FIG. 2), provides image light to an eyebox located at an exit pupil of another eye 220 of the user.

The waveguide display assembly 210 depicted in FIG. 2 may be configured to direct the image light to an eyebox located at an exit pupil 230 of the eye 220. An exit pupil 230 may be a location where the eye 220 is positioned in an eyebox region when the user wears the NED 100.

In some embodiments, the waveguide display assembly 210 may have one or more waveguide displays including, but not restricted to, a stacked waveguide display. The stacked waveguide display may be a polychromatic display (e.g., a red-green-blue (RGB) display) created by stacking waveguide displays whose respective monochromatic sources are of different colors. In some configurations, the stacked waveguide display may be a monochromatic display that can be projected on multiple planes (e.g., a multi-planar monochromatic display).

Figure 3:
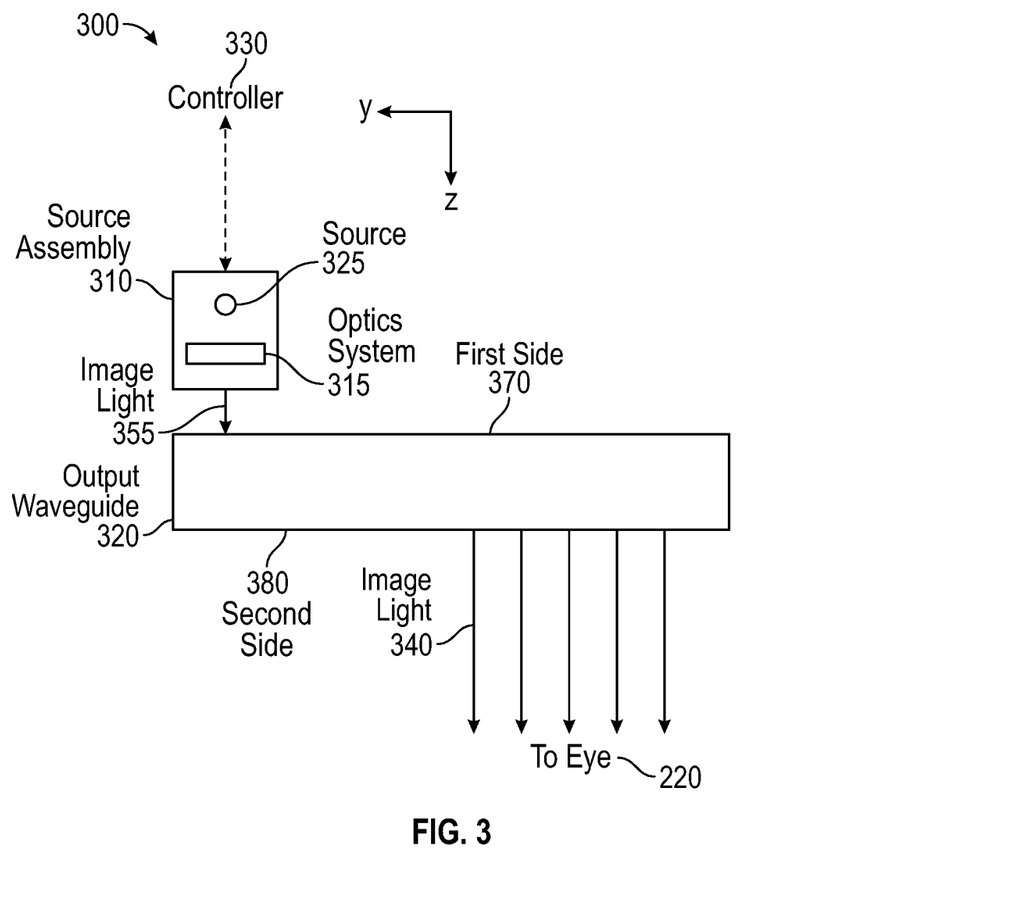
FIG. 3 illustrates a cross-section of a waveguide display in accordance with an embodiment.

FIG. 3 depicts a waveguide display 300 in accordance with an embodiment. The waveguide display 300 may include an output waveguide 320, a controller 330, and a source assembly 310. For purposes of illustration, FIG. 3 shows the waveguide display 300 associated with a single eye 220, but in some embodiments, another waveguide display separate (or partially separate) from the waveguide display 300 may provide image light to another eye of the user. In a partially separate system, one or more components may be shared between waveguide displays for each eye.

Referring first to the waveguide of the depicted embodiment, the output waveguide 320 may include a waveguide body with the first side 370 and a second side 380 that are opposite to each other. In the example of FIG. 3, the waveguide body may include the two opposite sides, the first side 370 and the second side 380, with each of the opposite sides representing a plane along the X-dimension and Y-dimension. The output waveguide 320 may be composed of one or more materials that facilitate total internal reflection of the image light 355. Total internal reflection is a phenomenon in which a propagated optical beam or wave is completely reflected at a medium boundary, which may occur when the beam or wave encounters the boundary at an angle of incidence greater than some critical angle with respect to the normal of the boundary. The output waveguide 320 may be composed of, e.g., silicon, plastic, glass, or polymers, or some combination thereof.

The waveguide display of FIG. 3 is an example with a single output waveguide 320 receiving a monochromatic beam of image light 355 from the source assembly 310. In alternate embodiments, the waveguide display 300 may include a plurality of source assemblies 310 and/or a plurality of output waveguides 320. Each source assembly 310 may emit monochromatic image light of a specific band of wavelength corresponding, for example, to one of the primary colors (red, green, and blue) and/or to white light. Each of the output waveguides 320 may be stacked together with a distance of separation to output an expanded image light 340 that is multi-colored.

The output waveguides may be stacked such that image light from each of the stacked waveguides occupies the same area of the exit pupil of the stacked waveguide display. For example, the output waveguides may be stacked such that adjacent output waveguides are lined up, and light from a rear output waveguide would pass through the waveguide adjacent to and in front of the rear output waveguide. In some configurations, the expanded image light 340 can couple to the user's eye 220 as a multiplanar display.

Referring next to the controller of the depicted embodiment, controller 330 may control the scanning operations of, and determine display instructions for, the source assembly 310. In some embodiments, display instructions may simply be an image file (e.g., bitmap). The display instructions may be received from, e.g., a console of a system. Display instructions are instructions that may be used by the source assembly 310 to generate image light 340. The display instructions may include, e.g., a type of a source of image light (e.g., monochromatic, polychromatic), a scanning rate, an orientation of a scanning apparatus, one or more illumination parameters, or some combination thereof. The controller 330 may include a combination of hardware, software, and/or firmware, not shown here so as not to obscure other aspects of the disclosure.

The controller 330 may provide display instructions to the source assembly 310. The display instructions may cause the source assembly 310 to render light such that image light exiting the output waveguide 320 scans out one or more 2D images. For example, the display instructions may cause the source assembly 310 (via adjustments to optical elements in the optics system 315) to scan out an image in accordance with a scan pattern (e.g., raster, interlaced, etc.). The display instructions may control an intensity of light emitted from the source 325, and the optics system 315 may scan out the image by rapidly adjusting orientation of the emitted light. If done fast enough, a human eye may integrate the scanned pattern into a single 2D image.

Referring now to the light source of the depicted embodiment, source assembly 310 may generate and output image light 355 to a first side 370 of the output waveguide 320. The image light 355 may propagate through the waveguide and may be emitted as image light 340. The image light 355 and the image light 340 may propagate in the same direction. In some configurations, the image light 340 may be monochromatic image light that can be projected on multiple planes (multi-planar monochromatic display). In alternate configurations, the image light 340 may be polychromatic image light that can be projected on multiple planes (multi-planar polychromatic display). Source assembly 310 may generate light in accordance with display instructions from the controller 330.

The source 325 may generate coherent or partially coherent image light. The source 325 may be, e.g., a laser diode, a vertical cavity surface emitting laser, a light emitting diode (LED), a tunable laser, a MicroLED, a super-luminous LED (SLED), or some other light source that emits, e.g., coherent or partially coherent light. The source 325 may emit light in a visible band (e.g., from about 390 nm to 700 nm), and it may emit light that is continuous or pulsed. In some embodiments, the source 325 may be a laser that emits light at a specific wavelength (e.g., 532 nanometers).

The source 325 may emit light in accordance with one or more illumination parameters received from the controller 330. An illumination parameter may be an instruction used by the source 325 to generate light and may include, e.g., restriction of input wave vector for total internal reflection, restriction of input wave vector for maximum angle, source wavelength, pulse rate, pulse amplitude, beam type (continuous or pulsed), other parameter(s) that affect the emitted light, or some combination thereof.

The optics system 315 may include one or more optical components that condition the light from the source 325. Conditioning light from the source 325 may include, e.g., expanding, collimating, adjusting orientation in accordance with instructions from the controller 330, some other adjustment of the light, or some combination thereof. The one or more optical components may include, e.g., lenses, liquid lens, mirrors, apertures, gratings, or some combination thereof. The optics system 315 may output the image light 355 at an orientation (in accordance with the display instructions) toward the output waveguide 320. The image light 355 may propagate along an input wave vector such that restrictions for both total internal reflection and maximum angle of propagation may be met.

Figure 4:
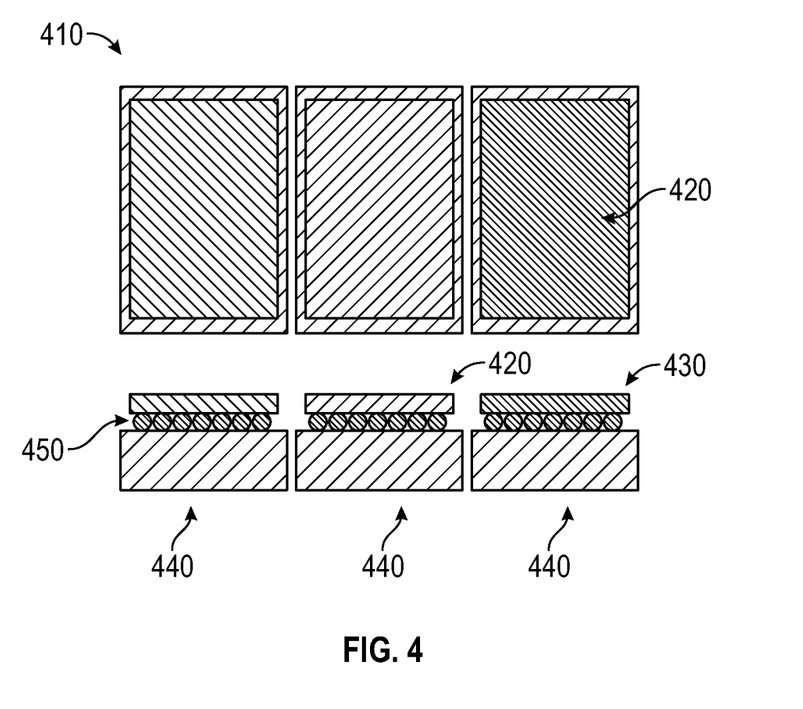
FIG. 4 illustrates a first ASIC assembly in accordance with an embodiment.

A source assembly 310 may include one or more monochromatic two-dimensional emitter arrays driven by one or more ASICs controlled by controller 330. FIG. 4 depicts an embodiment in which three separate ASICs drive three monochromatic emitter arrays (RGB: one red, one green, and one blue). Top (vertical) view 410 shows the three two-dimensional arrays. Side view 430 shows how the three separate ASICs 440 may be bonded to the arrays 420. Both the ASICS and the arrays may be contained within source assembly 310.

Fine pitch wire bonds 450 may be used to bond the ASICs 440 to the arrays 420. Fine pitch wire bonding may be performed using thermosonic, ultrasonic, or other techniques. Other types of wire bonding may include ball bonding, wedge bonding, and compliant bonding.

Figure 5:
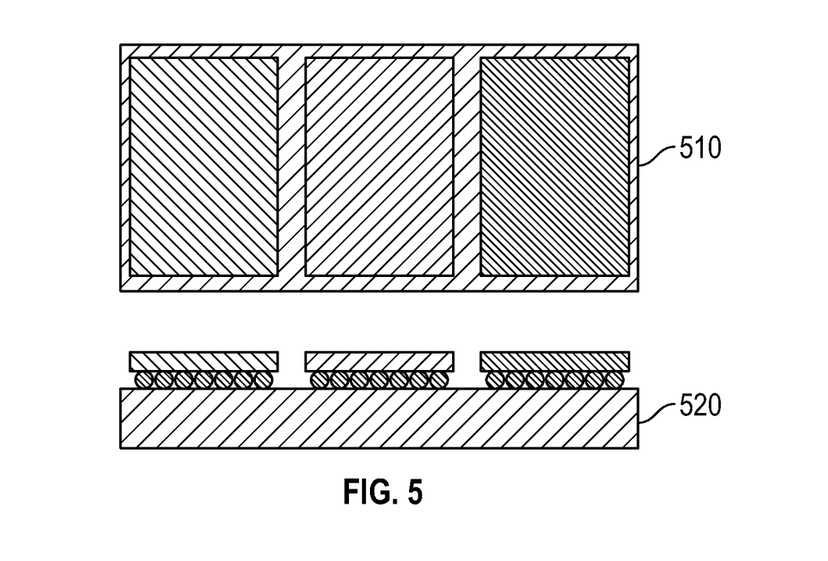
FIG. 5 illustrates a second ASIC assembly in accordance with an embodiment.

FIG. 5 depicts an embodiment in which a single ASIC 520 drives each of three monochromatic emitter arrays (RGB: one red, one green, and one blue) 510. The same ASIC may be bonded to and drive the red monochromatic emitter array, bonded to and drive the green monochromatic emitter array, and bonded to and drive the blue monochromatic emitter array. Using a single ASIC to drive all three arrays may enable precise, repeatable alignment of RGB displays to be achieved during fabrication (simpler optical alignment).

Figure 6:
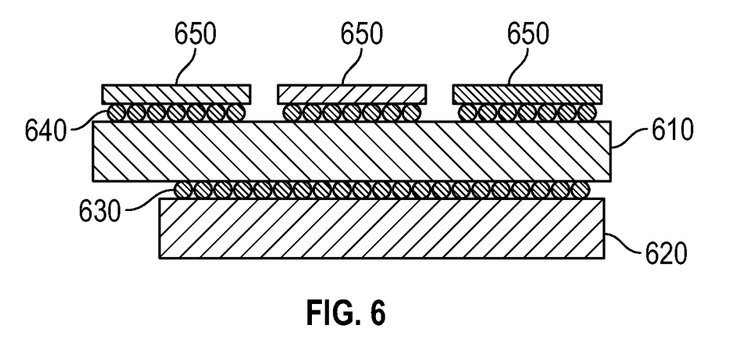
FIG. 6 illustrates a third ASIC assembly in accordance with an embodiment.

FIG. 6 depicts an embodiment in which a single ASIC 620 drives each of three monochromatic emitter arrays (red, green, and blue) 650 but is not directly bonded to the arrays. A silicon interposer 610 with through-silicon vias may be bonded (on the lower side) to the ASIC with bonds 630, and the interposer 610 may be bonded (on the upper side) to each of the monochromatic emitter arrays 650 with bonds 640. The ASIC 620 may drive the arrays 650 via the interposer 610. As used with respect to this embodiment, the term "silicon interposer" generally refers to an intermediate silicon layer used for interconnection routing.

Use of a silicon interposer with through-silicon vias between the ASIC and the three displays may allow for easier RGB array alignment during fabrication and may provide more options for ASIC bonding (pad pitch, size, location, etc.). While this embodiment may use a silicon interposer, any suitable type of through-silicon interface could be used in this context without departing from the scope of this embodiment. For example, suitable alternatives to interposers may include any type of vertical interconnect between the ASIC and the arrays that passes substantially through one or more of a silicon wafer, a silicon die, silicon active circuits, silicon passive circuits, or other silicon circuits, components or layers.

Figure 7:
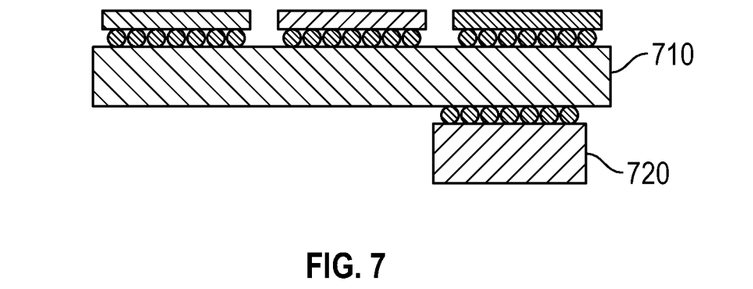
FIG. 7 illustrates a fourth ASIC assembly in accordance with an embodiment.

FIG. 7 also depicts an embodiment in which a single ASIC 720 drives each of three monochromatic emitter arrays (red, green, and blue) but is not directly bonded to the arrays. A silicon interposer 710 may be bonded (on the lower side) to the ASIC, and the interposer 710 may be bonded (on the upper side) to each of the monochromatic emitter arrays.

However, in this embodiment the ASIC may be configured to drive the monochromatic emitter arrays in sequence by, for example, sequentially addressing common cathodes and anodes. This embodiment thus permits the use of smaller, less expensive ASICs. Although all three colors are not displayed simultaneously, the lag time may be sufficiently small as to be undetectable by the human eye. Other forms of sequential processing could be used in this context (for example, when non-LED light sources are used) without departing from the scope of this embodiment.

Figure 8:
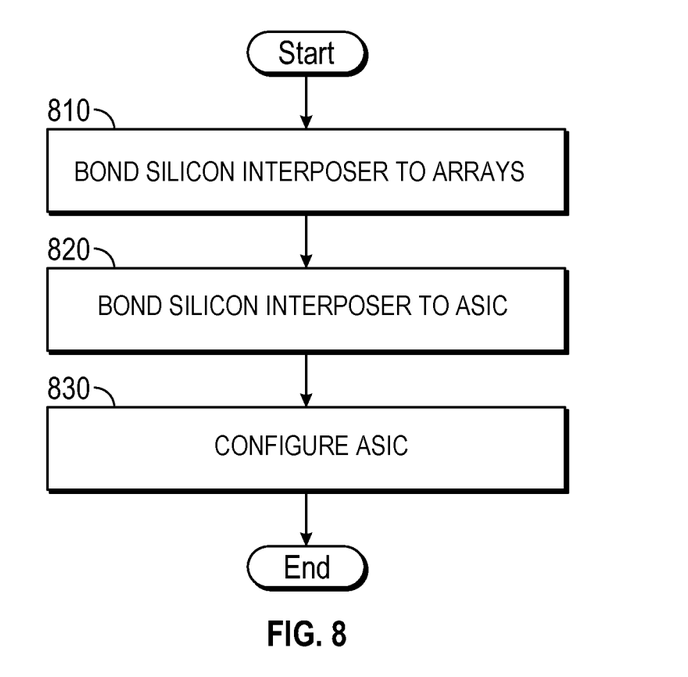
FIG. 8 is a flow diagram illustrating steps of a method of an embodiment.

FIG. 8 is a flow diagram illustrating steps of a method embodiment. Step 810 includes bonding a silicon interposer on a first side to a first monochromatic emitter array and a second monochromatic emitter array. Step 820 involves bonding the silicon interposer on a second side, opposite the first side, to at least one ASIC. As explained above, the silicon interposer may provide an interface between (a) the first monochromatic emitter array and the second monochromatic emitter array, and (b) the at least one ASIC.

In step 830, the at least one ASIC may be configured to drive the first and second monochromatic emitter arrays via the silicon interposer to project image light into a waveguide. The image light may include a two-dimensional monochromatic image in a first color emitted by the first monochromatic emitter array, and a two-dimensional monochromatic image in a second color emitted by the second monochromatic emitter array. The first and second colors may be different from each other, with the two-dimensional monochromatic images being projected along a common axis. In an embodiment, configuration of the ASIC may include custom design and fabrication to drive monochromatic emitter arrays. In addition, the image light emitted by the arrays may be determined by the ASIC driving the arrays.

Alternatively, step 810 may include bonding a silicon interposer on a first side to at least a first monochromatic emitter array, a second monochromatic emitter array, and a third monochromatic emitter array. In this example, step 820 may include bonding the silicon interposer on a second side, opposite the first side, to at least one ASIC. In this embodiment, the silicon interposer may provide an interface between (a) the first monochromatic emitter array, the second monochromatic emitter array, and the third monochromatic emitter array, and (b) the at least one ASIC.

In step 830, the at least one ASIC may be configured to drive the first, second, and third monochromatic emitter arrays via the silicon interposer to project image light into a waveguide. The image light may include a two-dimensional monochromatic image in a first color emitted by the first monochromatic emitter array, a two-dimensional monochromatic image in a second color emitted by the second monochromatic emitter array, and a two-dimensional monochromatic image in a third color emitted by the third monochromatic emitter array. The first, second, and third colors may all be different from each other, with the two-dimensional monochromatic images being projected along a common axis. In other embodiments, the at least one ASIC may be bonded directly to at least one of the arrays, without the use of an interposer.

While the embodiments described herein are often described as using red, green, and blue colors as examples, any colors, including black and white, and any number of colors, could be used in any of the described embodiments without departing from the scope of those embodiments. Moreover, in some embodiments not every color is different from every other color; there may be, for example, one monochromatic emitter array for red, one monochromatic emitter array for blue, and two monochromatic emitter arrays for green.

In addition, while certain embodiments have been described as using one or more ASICs, other circuitry may be used in place of an ASIC without departing from the scope of the described embodiments. For example, suitable field programmable gate arrays (FPGAs) and/or application specific standard products (ASSPs) may be used, if they are configured to drive the monochromatic emitter arrays.

In some examples, the devices and systems described and/or illustrated herein may broadly represent any type or form of computing device or system capable of executing computer-readable instructions. In their most basic configuration, these device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some examples, computer-executable instructions contained within modules may perform one or more of the steps, processes, and/or procedures described and/or illustrated herein. These modules may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the devices or systems described and/or illustrated herein. One or more of these modules may also represent all or portions of one or more special-purpose devices configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
   a waveguide; and
   one or more projector assemblies configured to project image light into the waveguide, wherein each of the one or more projector assemblies comprises:
      a first monochromatic emitter array having a plurality of emitters of a first color disposed in a two-dimensional configuration;
      a second monochromatic emitter array having a plurality of emitters of a second color disposed in a two-dimensional configuration; and
   at least one circuit configured to drive in sequence each of the first monochromatic emitter array and the second monochromatic emitter array by sequentially addressing common cathodes and anodes to emit images of the first and second colors along a common axis, the first color being different from the second color.

2. The device of claim 1, wherein the at least one circuit comprises:
   a first circuit configured to drive the first monochromatic emitter array; and
   a second circuit configured to drive the second monochromatic emitter array.

3. The device of claim 2,
   wherein each of the one or more projector assemblies further comprises a third monochromatic emitter array having a plurality of emitters disposed in a two-dimensional configuration, and
   wherein the at least one circuit comprises a third circuit configured to drive the third monochromatic emitter array to emit images of a third color along the common axis, the third color being different from the first and second colors.

4. The device of claim 3, wherein monochromatic images of the first, second, and third color are combined within the waveguide to produce polychromatic images.

5. The device of claim 4, wherein the polychromatic images are displayed to a user wearing a near eye display comprising the waveguide.

6. The device of claim 1, wherein the at least one ASIC circuit comprises a single circuit configured to drive at least the first monochromatic emitter array and the second monochromatic emitter array.

7. The device of claim 6, further comprising a silicon interposer bonded on a first side to at least the first monochromatic emitter array and the second monochromatic emitter array, and bonded on a second side, opposite the first side, to the single circuit, the silicon interposer providing an interface between (a) the first monochromatic emitter array and the second monochromatic emitter array and (b) the single circuit.

8. The device of claim 1, wherein:
   each of the one or more projector assemblies further comprises a third monochromatic emitter array having a plurality of emitters disposed in a two-dimensional configuration and emitting a third color different from the first and second color, and
   the at least one circuit comprises a single circuit configured to drive at least the first monochromatic emitter array, the second monochromatic emitter array, and the third monochromatic emitter array to emit images of the first, second, and third colors, respectively, along the common axis.

9. The device of claim 8, further comprising a silicon interposer bonded on a first side to the first monochromatic emitter array, the second monochromatic emitter array, and the third monochromatic emitter array, and bonded on a second side, opposite the first side, to the single circuit, the silicon interposer providing an interface between (a) the first monochromatic emitter array, the second monochromatic emitter array, and the third monochromatic emitter array and (b) the single circuit.

10. The device of claim 9, wherein the single circuit is configured to drive in sequence each of the first monochromatic emitter array, the second monochromatic emitter array, and the third monochromatic emitter array by sequentially addressing common cathodes and anodes.

11. The device of claim 1, wherein the waveguide combines monochromatic images projected by the first and second monochromatic emitter arrays.

12. A method comprising:
bonding a first monochromatic emitter array and a second monochromatic emitter array to at least one circuit,
wherein the at least one circuit is configured to drive in sequence each of the first monochromatic emitter array and the second monochromatic emitter array by sequentially addressing common cathodes and anodes to project image light into a waveguide, and
wherein the image light comprises:
a two-dimensional monochromatic image in a first color emitted by the first monochromatic emitter array; and
a two-dimensional monochromatic image in a second color emitted by the second monochromatic emitter array,
the first and second colors being different from each other, with the two-dimensional monochromatic images being projected along a common axis.

13. The method of claim 12, wherein the at least one circuit is configured to drive in sequence each of the first monochromatic emitter array, the second monochromatic emitter array, and a third monochromatic emitter array by sequentially addressing common cathodes and anodes.

14. The method of claim 12, wherein the at least one circuit comprises:
a first circuit configured to drive the first monochromatic emitter array;
a second circuit configured to drive the second monochromatic emitter array; and
a third circuit configured to drive a third monochromatic emitter array.

15. The method of claim 12, wherein the at least one ASIC circuit comprises a single circuit configured to drive at least two of the first monochromatic emitter array, the second monochromatic emitter array, and a third monochromatic emitter array.

16. The method of claim 15, wherein the single circuit is configured to drive in sequence each of the first monochromatic emitter array, the second monochromatic emitter array, and the third monochromatic emitter array by sequentially addressing common cathodes and anodes.

17. The method of claim 12, wherein at least the two-dimensional monochromatic images of the first and second colors are combined within the waveguide to produce polychromatic images.

18. The method of claim 12, further comprising:
bonding a silicon interposer on a first side to the first monochromatic emitter array, the second monochromatic emitter array, and a third monochromatic emitter array; and
bonding the silicon interposer on a second side, opposite the first side, to at least one circuit,
wherein the silicon interposer provides an interface between (a) the first monochromatic emitter array, the second monochromatic emitter array, and the third monochromatic emitter array, and (b) the at least one circuit.

19. A near-eye display system comprising:
a frame configured to secure to a user's head;
a waveguide coupled to the frame; and
one or more projector assemblies configured to project image light into the waveguide, wherein each of the one or more projector assemblies comprises:
a first monochromatic emitter array having a plurality of emitters of a first color disposed in a two-dimensional configuration;
a second monochromatic emitter array having a plurality of emitters of a second color disposed in a two-dimensional configuration; and
at least one circuit configured to drive in sequence each of the first monochromatic emitter array and the second monochromatic emitter array by sequentially addressing common cathodes and anodes to emit images of the first and second colors along a common axis, the first color being different from the second color.

* * * * *

UNITED STATES PATENT AND TRADEMARK OFFICE
CERTIFICATE OF CORRECTION

PATENT NO. : 10,739,595 B2  
APPLICATION NO. : 16/171822  
DATED : August 11, 2020  
INVENTOR(S) : James Ronald Bonar et al.

Page 1 of 1

It is certified that error appears in the above-identified patent and that said Letters Patent is hereby corrected as shown below:

In the Claims

In Column 10, Line 41, Claim 6, delete "one ASIC" and insert -- one --, therefor.

In Column 12, Line 1, Claim 15, delete "one ASIC" and insert -- one --, therefor.

Signed and Sealed this
Twentieth Day of October, 2020

Andrei Iancu
*Director of the United States Patent and Trademark Office*